(12) United States Patent
Barton

(10) Patent No.: US 9,423,285 B2
(45) Date of Patent: Aug. 23, 2016

(54) MEDICATION DISPENSER

(71) Applicant: Jack Barton, Fontana, CA (US)

(72) Inventor: Jack Barton, Fontana, CA (US)

( * ) Notice: Subject to any disclaimer, the term of this patent is extended or adjusted under 35 U.S.C. 154(b) by 0 days.

(21) Appl. No.: 14/634,027

(22) Filed: Feb. 27, 2015

(65) Prior Publication Data

US 2015/0297463 A1 Oct. 22, 2015

Related U.S. Application Data

(60) Provisional application No. 61/980,085, filed on Apr. 16, 2014.

(51) Int. Cl.
| | |
|---|---|
| *G01F 11/28* | (2006.01) |
| *B67D 3/00* | (2006.01) |
| *A61J 1/05* | (2006.01) |
| *A61J 1/14* | (2006.01) |

(52) U.S. Cl.
CPC .............. *G01F 11/28* (2013.01); *A61J 1/1418* (2015.05); *B67D 3/0045* (2013.01); *A61J 1/05* (2013.01); *A61J 1/1443* (2013.01)

(58) Field of Classification Search
CPC ............ A61J 1/22; A61J 1/2093; A61J 1/05; A61J 1/1443; A61J 1/1418; G01F 11/42; G01F 11/44; G01F 11/46; G01F 11/28; B67D 3/0045
USPC ...................... 222/451–455, 133, 138, 142.9, 222/367–369, 142, 522–525, 142.8, 142.5; 73/426–429
See application file for complete search history.

(56) References Cited

U.S. PATENT DOCUMENTS

| | | | | |
|---|---|---|---|---|
| 2,154,283 A | * | 4/1939 | Reisdorf ................. | G01F 11/24 222/196 |
| 2,841,312 A | * | 7/1958 | Bello ....................... | A47K 5/10 222/181.2 |
| 3,204,833 A | * | 9/1965 | Weitzner ................. | A47F 1/03 222/355 |
| 4,151,934 A | | 5/1979 | Saeki | |
| 4,951,839 A | | 8/1990 | Kong | |
| 5,127,553 A | | 7/1992 | Weinstein | |
| 5,662,249 A | * | 9/1997 | Grosse ................. | B65D 47/147 141/319 |
| 5,695,093 A | | 12/1997 | Lucius | |
| 6,293,440 B1 | * | 9/2001 | Weaver ................. | G01F 11/263 222/363 |
| 7,331,489 B2 | | 2/2008 | Glynn et al. | |
| 8,439,231 B2 | * | 5/2013 | Schroedter ............... | B65B 1/36 222/153.13 |
| D729,015 S | * | 5/2015 | Haidar-Daoud ............... | D7/589 |
| 2008/0134780 A1 | * | 6/2008 | Micheli ................... | G01F 11/44 73/428 |
| 2015/0041500 A1 | * | 2/2015 | Ismail ................... | G01F 11/282 222/434 |

* cited by examiner

*Primary Examiner* — Lien Ngo
(74) *Attorney, Agent, or Firm* — Global Intellectual Property Agency, LLC; Daniel Boudwin

(57) ABSTRACT

Disclosed is a liquid medication dispenser that can be removably attached to various types of bottles or containers. In one embodiment, the dispenser includes a cylindrical reservoir that tapers from a lower end to an upper end thereof. The lower end includes a cap that can be removably attached to a bottle. The upper end includes a lid that can open and close when actuated via a lever on the exterior of the reservoir. The interior of the reservoir includes a spherical valve having a port that extends the diameter thereof. The valve can be rotated via a knob so that the port can be aligned vertically or horizontally, wherein the interior of the bottle is in fluid communication with the reservoir when the port is aligned vertically and the interior of the bottle is blocked from the reservoir when the port is aligned horizontally.

9 Claims, 5 Drawing Sheets

MEDICATION DISPENSER

CROSS REFERENCE TO RELATED APPLICATION

This application claims the benefit of U.S. Provisional Application No. 61/980,085 filed on Apr. 16, 2014. The above identified patent application is herein incorporated by reference in its entirety to provide continuity of disclosure.

BACKGROUND OF THE INVENTION

1. Field of the Invention

The present invention relates to a medication dispenser. More specifically, the present invention pertains to an improved dispenser for liquid medication that can measure an exact dose of liquid medicine.

Many medications are available in liquid forms because liquid medications generally work faster and better than tablets and capsules. Young children are more likely to be given liquid medicine than medicine in other forms, especially because liquid medicines are easier to administer. One common error with liquid medications involves taking the wrong dose. Even the most conscientious caregivers can measure a wrong dose because of confusion between different dose measurements. For example, some liquid medications are measured in milliliters, others in teaspoons, some with measuring cups, and some with syringes. Additionally, it can be difficult to measure an exact dosage required because liquid medication can easily spill out of a bottle. Thus, a device that provides an exact dosage of a liquid medication to prevent over dosage or improper administration of medication is desired.

2. Description of the Prior Art

Devices have been disclosed in the prior art that claim exact measure medication dispensers. These include devices that have been patented and published in patent application publications. The foregoing is a list of devices deemed most relevant to the present disclosure, which are herein described for the purposes of highlighting and differentiating the unique aspects of the present invention, and further highlighting the drawbacks existing in the prior art.

Some prior art devices disclose a measurement cup that can be removably attached to a bottle and used as a cap. The cup comprises a plurality of markings thereon for indicating the amount of liquid contents therein. Other devices disclose squeeze dispensers having a cup affixed at the top portion thereof. The cup is in fluid communication with the interior of the dispenser via a tube. As the dispenser is squeezed, liquid travels from the interior of the dispenser, through the tube, and exits into the cup.

Other devices disclose a container having a reservoir at its opening within the interior volume thereof. The reservoir is in fluid communication with the interior volume so that it can collect and hold liquid contents therein. When the container is tipped to one side, the liquid contents within the reservoir can be poured out of the container. Because the reservoir blocks the opening of the container, contents within the interior volume do not dispense while the contents in the reservoir are poured out.

The foregoing devices, however, do not disclose a medication dispenser that can be removably attached to a bottle for dispensing a predetermined amount of content therefrom. Additionally, the devices disclosed in the prior art have several known drawbacks. These devices are limited in that the dispensing mechanism is integral to the container in which it is installed. Thus, the dispensing mechanism is limited for use with a single container. Furthermore, the prior art devices do not allow the user to pour liquid contents back into a container when a reservoir has been overfilled.

The present invention overcomes these limitations by disclosing a medication dispenser that can be threadably attached to various types of bottles. Thus, the present invention increases the versatility of a medication dispenser by providing one that can be utilized with a number of different container and bottle types, and further one that is easily interchangeable and removable. The present invention further comprises a valve that can be used to control the flow of liquid to the reservoir thereof. It is therefore submitted that the present invention is substantially divergent in design elements from the prior art, and consequently it is clear that there is a need in the art for an improvement to exact measure medication dispensers. In this regard, the instant invention substantially fulfills these needs.

SUMMARY OF THE INVENTION

In view of the foregoing disadvantages inherent in the known types of exact measure medication dispensers now present in the prior art, the present invention provides a new and improved medication dispenser wherein the same can be utilized for measuring and dispensing an exact dose of liquid medicine. In one embodiment, the present invention provides a medication dispenser having a reservoir with an open upper end and an open lower end. The lower end comprises a cap for removably attaching the reservoir to an opening of a bottle or a container so that the reservoir is in fluid communication with the interior of the bottle. The upper end comprises a lid that can slideably open and close when actuated by a lever disposed on the exterior of the reservoir.

The interior of the reservoir comprises a spherical valve having a port that extends through the diameter thereof. The valve can be rotated via a knob so that the axis of the port is vertical. When the port is vertical, the liquid contents in the bottle can flow through the port and collected in the reservoir. The valve can also be rotated so that the axis of the port is horizontal. When the port is horizontal, the reservoir blocks the opening of the bottle so as to prevent the contents in the bottle from flowing into the reservoir. Once a desired amount of liquid contents is collected in the reservoir, the lid can be opened to dispense the liquid contents therefrom.

It is therefore an object of the invention to provide a new and improved medication dispenser that has all of the advantages of the prior art and none of the disadvantages.

Another object of the present invention is to provide a new and improved medication dispenser that can be used with a wide variety of liquid medication bottles.

Yet another object of the present invention is to provide a new and improved medication dispenser that comprises a reservoir that is adapted to hold a predetermined amount of liquid contents therein.

Still yet another object of the present invention is to provide a new and improved medication dispenser that comprises a lid that can be opened and closed to dispense liquid contents in a controlled manner.

Still yet another object of the present invention is to provide a new and improved medication dispenser wherein the device may be readily fabricated from materials that permit relative economy and are commensurate with durability.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein the numeral annotations are provided throughout.

DETAILED DESCRIPTION OF THE INVENTION

Figure 1:
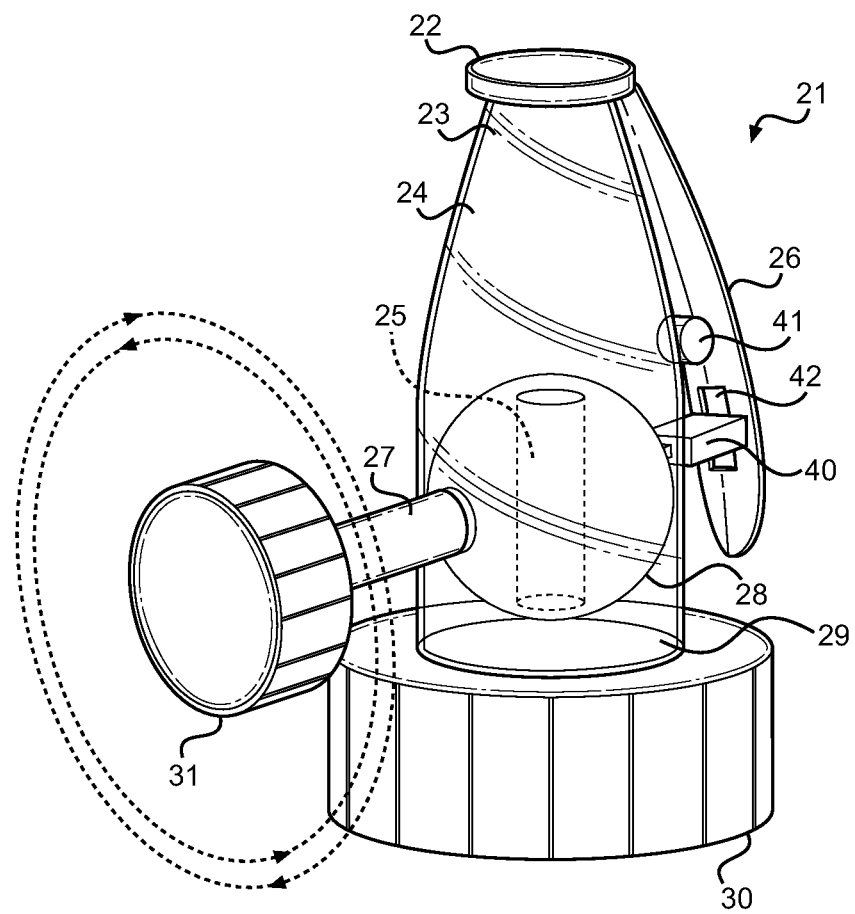
FIG. 1 shows a perspective view of the present invention.

References are made herein to the attached drawings. Like reference numerals are used throughout the drawings to depict like or similar elements of the medication dispenser. For the purposes of presenting a brief and clear description of the present invention, the preferred embodiment will be discussed as used to measure and dispense an exact dosage of liquid medicine. The figures are intended for representative purposes only and should not be considered to be limiting in any respect.

Referring now to FIG. 1, there is shown a perspective view of the present invention. In one embodiment, the present medication dispenser 21 comprises a reservoir 24 having an open upper end 23 and an open lower end 29. The reservoir 24 comprises a defined interior volume for holding liquid contents therein. In one embodiment of the present invention, the interior volume of the reservoir 24 is equal to a defined dosage, which allows for users to dispense the specific prescribed dosage of their medication. For this embodiment, the present is provided in multiple different sizes, i.e. with reservoirs 24 having differing interior volumes, which allows for individuals to choose the medication dispenser 21 corresponding to their prescribed medication dosage and then attach the appropriately-sized medication dispenser 21 to the medication bottle to dispense the appropriate dosage of medication therefrom. In others embodiments, the reservoir 24 further comprises markings thereon for indicating the amount of liquid contents contained therein. The reservoir 24 comprises a circular cross section with a diameter. The reservoir 24 tapers from the lower end 29 to the upper end 23. Accordingly, the diameter of the cross section of the reservoir 24 decreases from the lower end 29 to the upper end 23.

The lower end 29 of the reservoir is connected to a cap 30 that is adapted to threadably attach to a bottle of medication or other types of container. The upper end 23 of the reservoir 24 comprises a lid 22 that can slideably open and close. The lid 22 is attached to an end of a lever 26, which is secured to the exterior of the reservoir 24. In the illustrated embodiment, the lever 26 is connected to the exterior of the reservoir 24 via a fulcrum 41 so that it can be depressed and then automatically returned to the starting position when released. The lever 26 operates with a turning key 40, which is rotatably connected to a valve 28 disposed within the reservoir 24. The turning key 40 can be rotated to fit within an opening 42 disposed on the lever 26, wherein the turning key 40 can be rotated via the knob 31. In a closed position, the turning key 40 is substantially perpendicular to the opening 42 so that it prevents the lever 26 from being pressed inward. In an open position, the turning key 40 is substantially parallel to the opening 42 and directly aligned with the opening 42. In this way, the turning key 42 can be partially inserted through the opening, thereby allowing the lever 26 to be pressed inward. When the lever 26 is depressed, the lid 22 is opened, and when the lever 26 is released, the lid 22 is closed.

The interior volume of the reservoir 24 comprises the valve 28 therein. The valve 28 is substantially spherical in shape and comprises a substantially cylindrical port 25 extending through the diameter thereof. The port 25 is adapted to allow fluid to pass through the valve 28. The diameter of the valve 28 is equal to the diameter of the reservoir 24 to a close tolerance so that the valve 28 is securely fitted in the interior volume of the reservoir 24, blocking the flow of liquid through the reservoir 24 while still allowing the valve 28 to rotate therein. Preferably, the valve 28 is positioned so that it is positioned near the lower end of the reservoir. The valve 28 is connected to a knob 31 via a stem 27. The knob 31 is secured at the exterior of the reservoir 24. Accordingly, a first end of the stem 27 is connected to the valve 28 through an opening on the reservoir 24 and the second end of the stem 27 is connected to the knob 31. It is contemplated that the opening on the reservoir 24 where the stem 27 connects to the valve 28 is completely sealed so as to prevent liquid from leaking therethrough.

The knob 31 comprises ridges thereon so that the knob 31 can be gripped easily and turned. The knob 31 is adapted to rotate in a clockwise direction and a counterclockwise direction, whereby rotating the knob 31 rotates the valve 28 and the turning key 40. In this way, the knob 31 can be used to set the valve 28 in an open and a closed position. Preferably, the turning key 40 is parallel to the opening 42 when the valve 28 is in a closed position; and the turning key 40 is perpendicular to the opening 42 when the valve 28 is in an open position. In this way, the lid 22 is prevented from accidentally opening while the valve 28 is open. It is contemplated that the valve 28 remains in place after it is rotated because the valve 28 fits snugly within the interior volume of the reservoir 24. Accordingly, the present invention does not require a locking mechanism to keep the valve 28 in place.

Figure 2:
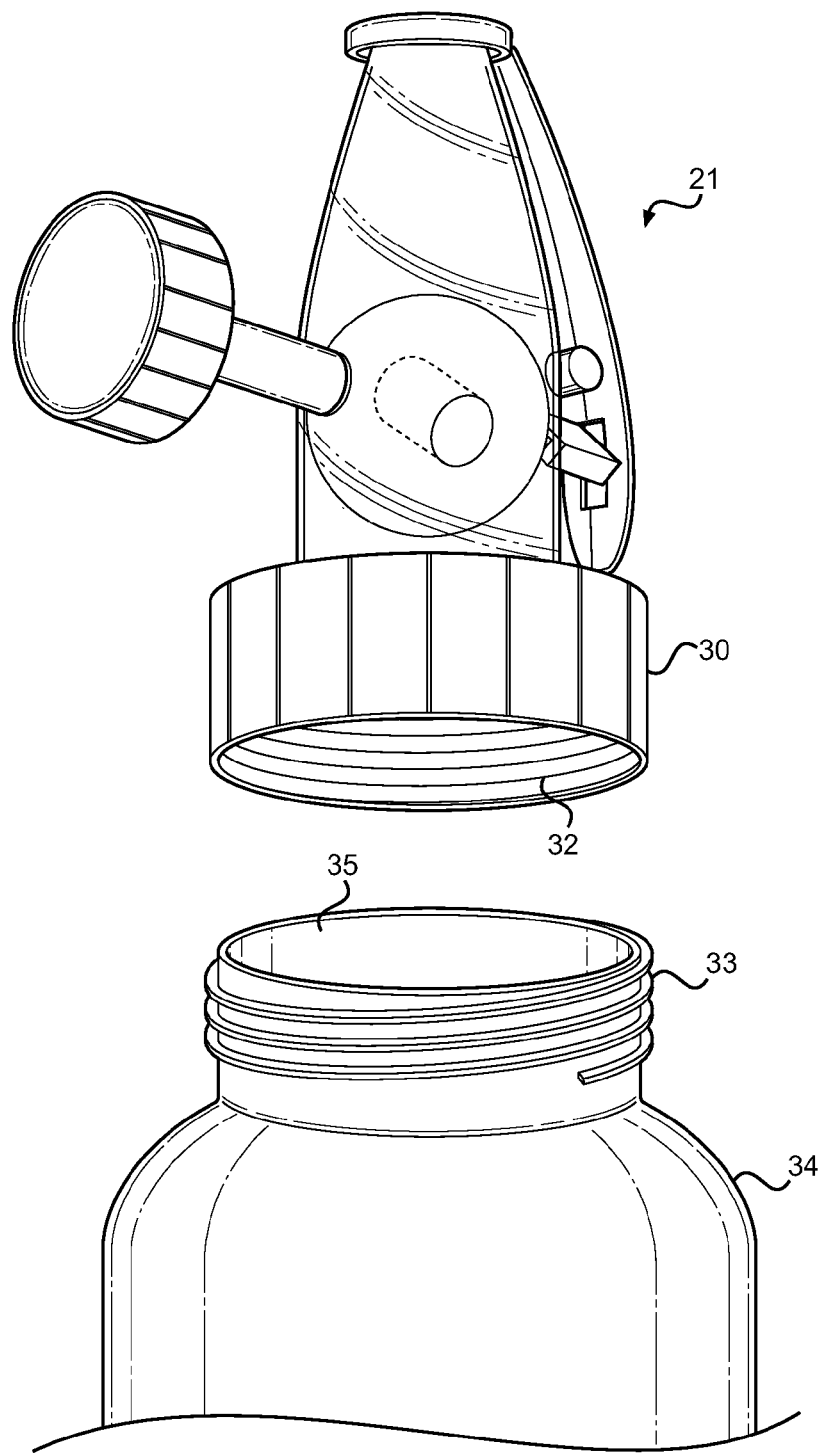
FIG. 2 shows a view of the present invention being attached to an opening of a bottle.

Referring now to FIG. 2, there is shown a view of the present invention being attached to a bottle. The medication dispenser 21 comprises a cap 30 that can removably attach to a bottle 34. The cap 30 comprises a substantially cylindrical shape with a top wall, a lateral wall, and an open bottom portion. The top wall of the cap 30 comprises an opening thereon. The diameter of the opening is substantially equal to the diameter of the cross section of the reservoir at the lower end thereof. The reservoir is attached to the top wall of the cap 30 so that the opening on the top wall is directly aligned with the lower end of the reservoir. In this way, the reservoir is in fluid communication with the bottle 34 when the medication dispenser 21 is removably attached thereto.

The exterior surface of the lateral wall comprises ridges thereon so that the cap 30 can be gripped easily and turned. The interior surface of the lateral wall comprises threaded elements 32 thereon. The threaded elements 32 on the interior surface of the lateral wall can be engaged to the threaded elements 33 around the opening 35 of the bottle 34. In other embodiments, however, it is contemplated that the 30 can attach to an opening of a bottle via press fit or other fastening means. Alternatively, the present invention may be manufactured so that it is integral to a medication bottle.

Figure 3:
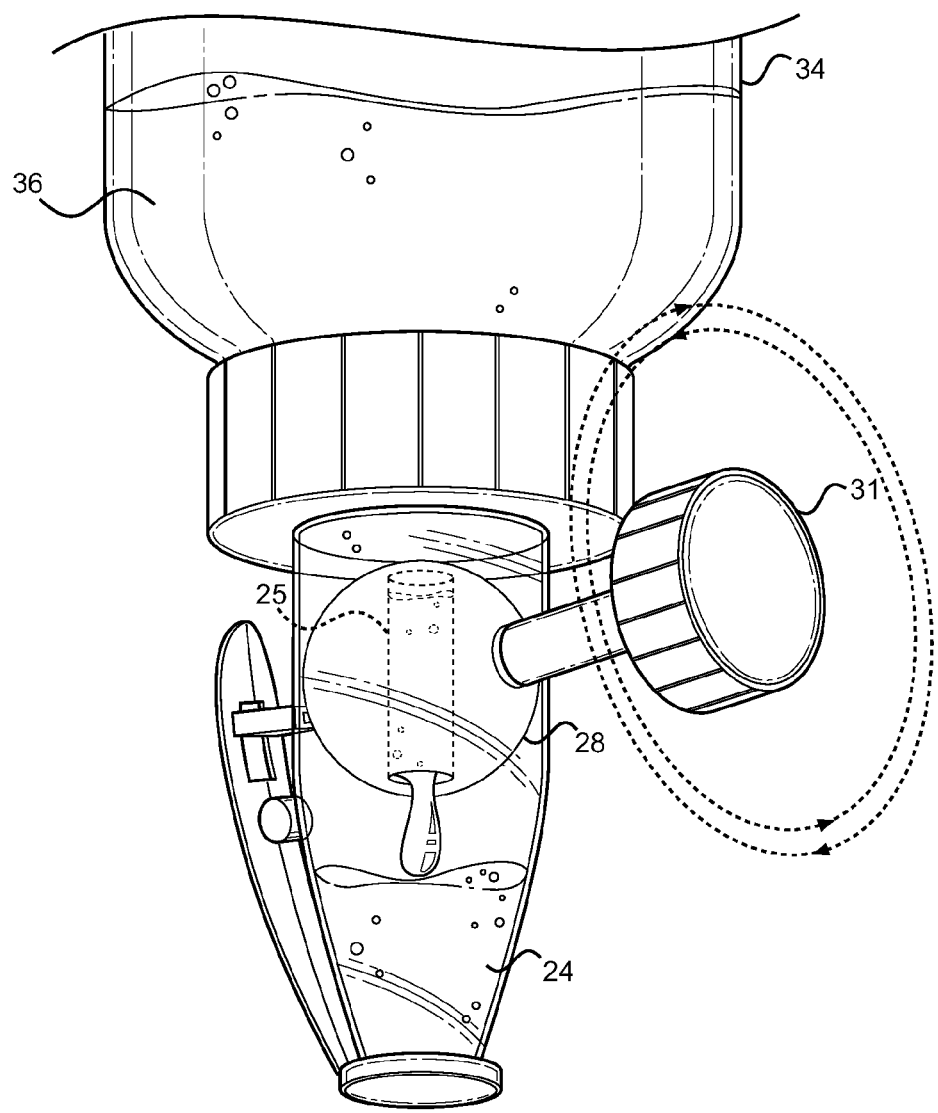
FIG. 3 shows a view of the valve in an open position.
Figure 4:
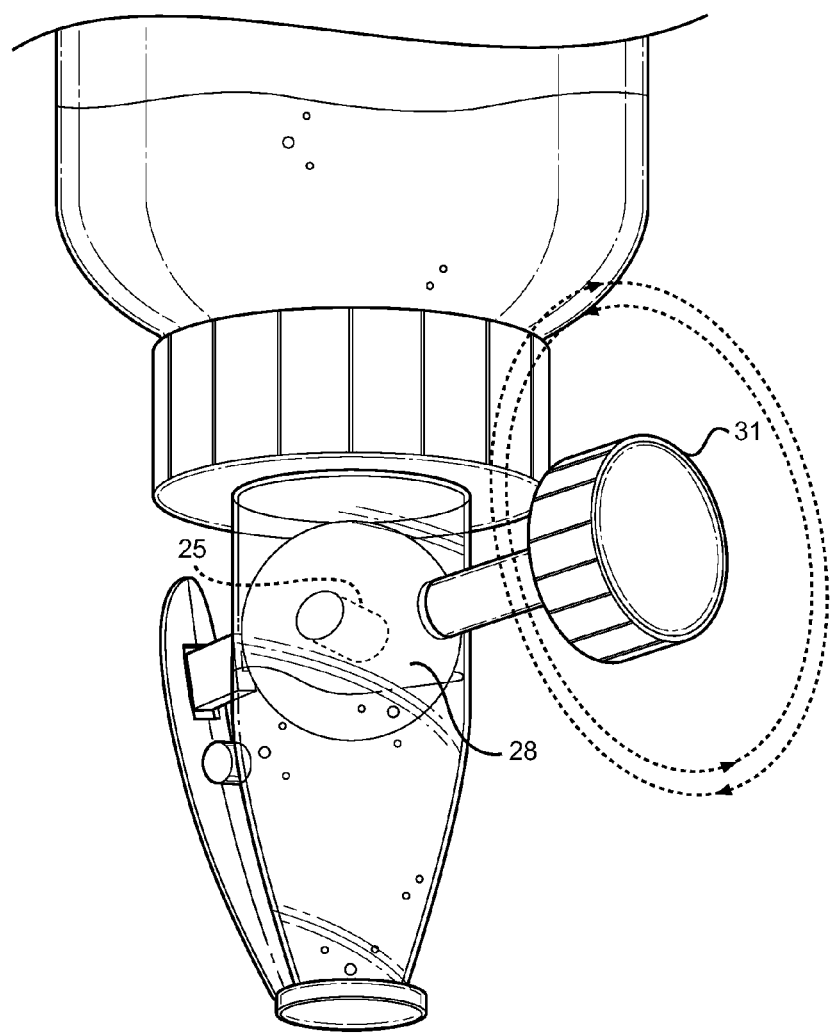
FIG. 4 shows a view of the valve in a closed position.

Referring now to FIGS. 3 and 4, there are shown views of the valve in an open position and in a closed position, respectively. In use, the bottle 34 is inverted so as to bring the contents 36 of the bottle 34 toward the opening thereof, which is connected to the cap of the medication dispenser. The knob 31 is rotated until the longitudinal axis of the port 25 of the valve 28 is substantially parallel with the vertical axis or until the port 25 is aligned to the opening at the lower end of the reservoir 24. In the vertical position, the interior of the bottle 34 and the reservoir 24 are in fluid communication. Thus, the contents 36 of the bottle 34 flow through the port 25 and into the reservoir 24. Additionally, in the vertical position, the turning key is substantially perpendicular to the opening disposed on the lever, blocking the opening. Such positioning of the turning key prevents the lever from being actuated.

Once the reservoir 24 is full or a desired amount of content 36 is in the reservoir, the knob 31 is rotated until the axis of the port 25 is substantially parallel with the horizontal axis or until the port 25 is misaligned to the opening at the lower end of the reservoir 24. For embodiments of the present invention wherein the interior volume of the reservoir 24 is equal to a defined dosage, fully filling the interior volume with the liquid medication ensures that the proper dosage is automatically dispensed by the present invention, without the risk of overdosing. For embodiments of the present invention comprising markings thereon for measuring different volumes of the medication dosage, the contents 36 in the reservoir 24 can be poured back into the bottle if the reservoir 24 has been overfilled. In the horizontal position, the interior of the bottle 34 and the reservoir 24 are not in fluid communication because the valve 28 obstructs the reservoir 24. In this way, the contents 36 are prevented from flowing from the interior of the bottle 34 into the reservoir 24. Additionally, the turning key is substantially parallel and directly aligned with the opening disposed on the lever. This position allows the lever to be depressed because the turning key can be partially inserted through the opening on the lever.

Figure 5:
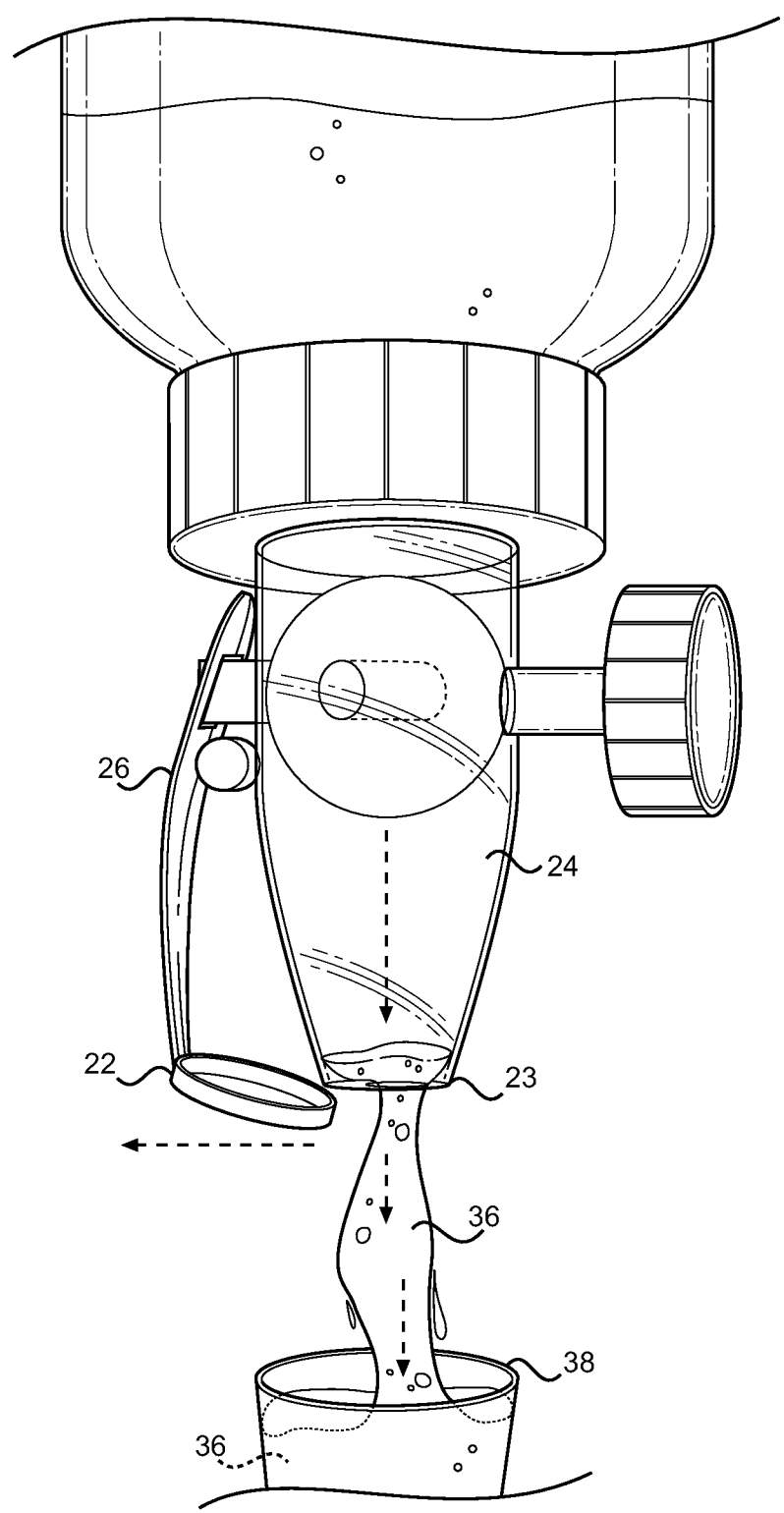
FIG. 5 shows a view of the present invention being used to dispense liquid medication into a cup.

Referring now to FIG. 5, there is shown a view of the present invention being used to dispense liquid medication into a cup. The lever 26 is connected to a fulcrum so that it can be depressed and then released, whereby releasing the lever 26 causes the lever 26 to return to its starting position. The lid 22 is attached to the end of the lever. In this way, the lid 22 can slide in and out of position as the lever is depressed and released.

In the closed position, the lid 22 creates a complete seal at the upper end 23 of the reservoir 24 so that the contents 36 within the reservoir 24 do not leak or spill therefrom. In some embodiments, it is contemplated that the perimeter of the lid 22 at the interior surface thereof comprises a gasket or another material for sealing the junction between the upper end 23 of the reservoir 24 and the lid 22. When the lid 22 is in the opened position, the contents 36 in the reservoir 24 can be dispensed into a cup 38 or another container. In this way, the present invention is used to measure and dispense an exact dosage of liquid medicine.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above descriptions then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A medication dispenser, comprising:
   a reservoir having an upper end, a lower end, and an interior volume;
   a lever attached to said reservoir via a fulcrum;
   a lid attached to said lever;
   wherein said lid is movable between an open position and a closed position;
   a cap attached to said lower end;
   wherein said cap is adapted to attach to an opening of a bottle such that said interior volume of said reservoir is in fluid communication with said bottle;
   a valve secured within said interior volume;
   said valve having a port extending therethrough;
   a knob attached to said valve;
   whereby rotating said knob rotates said valve between an open position and a closed position;
   a turning key rotatably attached to said valve;
   wherein said turning key can rotate between a perpendicular position and a parallel position via said knob;
   said lever comprising an opening that is configured to fit said turning key therethrough when said turning key is in said parallel position;
   wherein said lever is adapted to be depressed when said turning key is in said parallel position;
   wherein said lever cannot be depressed when said turning key is in said perpendicular position.

2. The medication dispenser of claim 1, wherein said cap comprises a top wall, a lateral wall, leaving a bottom portion of said cap open;
   an interior surface of said lateral wall comprising threaded elements.

3. The medication dispenser of claim 2, wherein said lower end of said reservoir is attached to said top wall of said cap.

4. The medication dispenser of claim 1, wherein said valve and said knob are connected via a stem having a first end and a second end;
   said first end of said stem connected to said valve through an opening on said reservoir;
   wherein said opening is sealed around a perimeter thereof;
   said second end of said stem connected to said knob.

5. The medication dispenser of claim 1, wherein said reservoir comprises a circular cross section with a diameter;
   wherein said diameter decreases from said lower end to said upper end.

6. The medication dispenser of claim 1, wherein said valve comprises a spherical shape.

7. The medication dispenser of claim 6, wherein said reservoir comprises a circular cross section with a diameter;
   wherein a diameter of said valve is equal to said diameter of said reservoir within a close tolerance.

8. The medication dispenser of claim 1, wherein said turning key is in said perpendicular position when said valve is in said open position;

wherein said turning key is in said parallel position when said valve is in said closed position.

9. The medication dispenser of claim 1, wherein an axis of said port is substantially parallel with a horizontal axis when said valve is in said closed position;

wherein said axis of said port is substantially parallel with a vertical axis when said valve is in said open position.

* * * * *